United States Patent [19]
Tassone et al.

[11] Patent Number: 4,559,188
[45] Date of Patent: Dec. 17, 1985

[54] METHOD FOR MAKING A LAYER OF REINFORCED POLYMERIC MATERIAL

[75] Inventors: Joseph V. Tassone, Kettering; James T. Candor, Washington Township, Montgomery County, both of Ohio

[73] Assignee: Dayco Corporation, Dayton, Ohio

[21] Appl. No.: 465,960

[22] Filed: Feb. 14, 1983

[51] Int. Cl.⁴ .............................................. B29D 29/02
[52] U.S. Cl. ....................... 264/24; 264/108; 264/136; 425/28 B; 425/174.8 E
[58] Field of Search ................ 264/24, 108, 136; 425/174.8 E, 28 B

[56] References Cited

U.S. PATENT DOCUMENTS

| | | | |
|---|---|---|---|
| 2,691,611 | 10/1954 | Saks | 264/24 |
| 2,820,716 | 1/1958 | Harmon et al. | 264/24 |
| 3,414,444 | 12/1968 | Bobkowicz et al. | 264/24 |
| 3,418,186 | 12/1968 | Wetzel | 264/24 |
| 3,496,255 | 2/1970 | Erxleben et al. | 264/24 |
| 3,708,561 | 1/1973 | Horimoto et al. | 264/24 |

FOREIGN PATENT DOCUMENTS

| | | | |
|---|---|---|---|
| 2016746 | 10/1970 | Fed. Rep. of Germany | 264/24 |
| 2468678 | 5/1981 | France | 264/24 |
| 48-9565 | 3/1973 | Japan | 264/24 |
| 1327586 | 8/1973 | United Kingdom | 264/24 |

Primary Examiner—Jeffery Thurlow
Attorney, Agent, or Firm—Joseph V. Tassone

[57] ABSTRACT

A substantially flat layer of material and method for making the same are provided, the flat layer of material having opposed substantially parallel spaced apart flat surfaces and comprising polymeric material and reinforcing particles disposed in the polymeric material and having at least a part thereof with the long dimensions thereof oriented so as to be substantially perpendicular to the opposed surfaces thereof.

6 Claims, 12 Drawing Figures

METHOD FOR MAKING A LAYER OF REINFORCED POLYMERIC MATERIAL

BACKGROUND OF THE INVENTION

1. Field of the Invention

This invention relates to an improved substantially flat layer of reinforced polymeric material and to a method and apparatus for making the same as well as to a product containing such layer of material.

2. Prior Art Statement

It is known in the art to provide a substantially flat layer of material having opposed substantially parallel spaced apart flat surfaces and comprising polymeric material and reinforcing particles in the polymeric material and having at least a part thereof with the long dimensions thereof oriented in a direction to be substantially parallel with those surfaces. For example see the U.S. Pat. No. 3,657,938 of David G. Fisher and the U.S. Pat. No. 4,027,545 of Jack D. White, Jr. Also see the copending patent application Ser. No. 367,520, filed Apr. 12, 1982, now U.S. Pat. No. 4,511,521, of Paul M. Standley which is considered to be prior art to applicants and wherein the flat layer of material initially comprises a liquid layer of the polymeric material and the reinforcing particles wherein the reinforcing particles were randomly disposed in the liquid layer and then had at least a part thereof oriented while the polymeric material was still in the liquid layer thereof, the liquid layer than having been dried to at least a degree thereof that caused the polymeric material thereof to hold the part of the particles in the oriented condition thereof.

It is known to orient magnetic particles in a flat layer of liquid polymeric material with a magnetic field imposed through the layer in a direction transverse to the flat surfaces thereof and while holding the particles in such oriented condition with the field, heat the polymeric material to set the same and thereby permanently hold the particles in their oriented condition whereby a magnetic polymeric layer is made. For example, see the U.S. Pat. No. 3,312,763 of Donald Peccerill et al.

It is also known to utilize an electrostatic field for augmenting the heat drying of liquid bearing material by passing the liquid bearing material through an electrostatic field while the material is being heated by heating means. For example, see the U.S. Pat. No. 4,338,729 of James T. Candor and the U.S. Pat. No. 4,359,826 of Robert R. Rounsley.

SUMMARY OF THE INVENTION

It is one feature of this invention to provide an improved substantially flat layer of particle reinforced polymeric material wherein at least part of the particles thereof have the long dimensions thereof oriented relative to the opposed substantially parallel spaced apart flat surfaces of the layer in an unique manner.

In particular, it is believed according to the teachings of this invention that if the long dimensions of the oriented particles are substantially perpendicular to the opposed spaced apart flat surfaces of the layer of polymeric material, improved columnar strength will be provided for that flat layer of material between the opposed flat surfaces thereof so that the resulting flat layer of material of this invention will improve the various products being made therefrom as will be apparent hereinafter.

For example, one embodiment of this invention provides a method of making a substantially flat layer of material having opposed substantially parallel spaced apart flat surfaces and comprising the steps of forming said material to comprise polymeric material and reinforcing particles disposed in the polymeric material by providing a liquid layer of the polymeric material and the reinforcing particles wherein the reinforcing particles are randomly disposed in the liquid layer and the liquid layer has the opposed substantially flat surfaces, orienting the long dimensions of at least a part of the particles thereof relative to the surfaces while the polymeric material is in the liquid layer thereof, and then drying the liquid layer to at least a degree thereof that causes the polymeric material thereof to hold the part of the particles in the oriented condition thereof, the step of orienting the part of the particles comprising the step of orienting the long dimensions thereof so as to be disposed substantially perpendicular to the surfaces and the step of providing the liquid layer of the polymeric material and the reinforcing particles comprising the step of coating a fabric sheet means with the polymeric material and the reinforcing particles while the polymeric material is in the liquid form thereof whereby the fabric sheet means is disposed in the liquid layer and is substantially between the flat surfaces thereof.

Accordingly, it is an object of this invention to provide an improved flat layer of material having one or more of the novel features of this invention as set forth above or hereinafter shown or described.

Another object of this invention is to provide a method of making such a flat layer of material, the method of this invention having one or more of the novel features of this invention as set forth above or hereinafter shown or described.

Another object of this invention is to provide an improved apparatus for making such a flat layer of material, the apparatus of this invention having one or more of the novel features of this invention as set forth above or hereinafter shown or described.

Another object of this invention is to provide an improved product utilizing such a flat layer of material, the product of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a substantially flat layer of material for making particular products, it is to be understood that the various features of this invention can be utilized singly or in various combinations thereof to provide the substantially flat layer of material for other uses and/or products as desired.

Therefore, this invention is not to be limited to only the embodiments illustrated in the drawings, because the drawings are merely utilized to illustrate some of the wide variety of uses of this invention.

Figure 1:
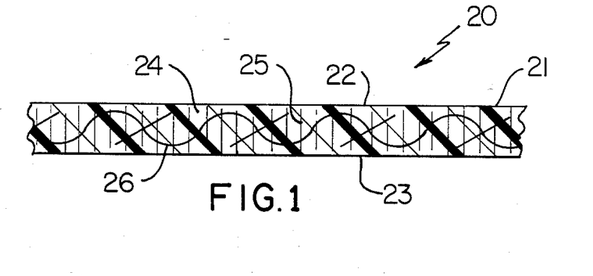
FIG. 1 is a fragmentary cross-sectional view illustrating one embodiment of the improved layer of material of this invention.

Referring now to FIG. 1, the improved substantially flat layer of material of this invention, generally indicated by the reference numeral 20, comprises a substantially flat sheet 21 having opposed substantially parallel spaced apart flat surfaces 22 and 23 and comprising polymeric material 24 having a plurality of reinforcing particles 25 therein, at least some of the particles 25 having the long dimensions thereof oriented so as to be disposed substantially perpendicular to the flat surfaces 22 and 23 as illustrated. It is believed that by having the long dimension of at least some of the reinforcing particles 25 disposed perpendicular to the surfaces 22 and 23 of the layer 20, improved columnar strength is provided for the sheet 21 between the opposed flat surfaces 22 and 23 thereof to resist crushing or abuse of the sheet 21 when subjected to forces imposed in a direction substantially perpendicular to those surfaces 22 and 23.

The sheet 21 of this invention as illustrated in FIG. 1 includes a fabric reinforcing sheet 26 disposed therein between the opposed surfaces 22 and 23 and being substantially coextensive therewith as will be apparent hereinafter. However, it is to be understood that the various features of this invention can provide the substantially flat layer of material 20 without the fabric sheet 26 if desired.

It is believed according to the teachings of this invention that by having at least some of the reinforcing particles 25 with the long dimension thereof disposed transverse to the opposed surfaces 22 and 23 of the sheet 21, the sheet 21 of this invention can be utilized to form various products so that the oriented particles 25 will provide their columnar strength in a direction that is beneficial to protecting the product being made therefrom.

Figure 2:
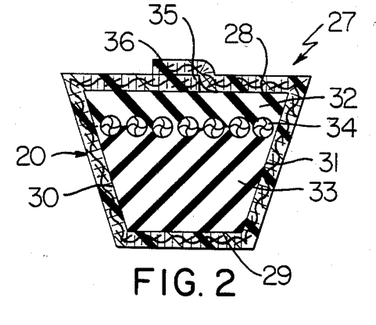
FIG. 2 is a cross-sectional view of an endless power transmission belt construction or the like utilizing the layer of material of this invention that is illustrated in FIG. 1.

For example, reference is now made to FIG. 2 wherein a product of this invention is generally indicated by the reference numeral 27 and comprises an endless power transmission belt of the typical "V" type wherein the polymeric body thereof has a substantially trapezoidal cross-sectional configuration defined by a pair of opposed flat parallel top and bottom surfaces 28 and 29 with a pair of angled side surfaces 30 and 31 disposed therebetween, the belt construction 27 having the conventional tension section 32, compression section 33 and load carrying section 34 disposed intermediate the tension section 32 and compression section 33 in a manner well known in the art.

As is conventional in the art, the opposed angular surfaces 30 and 31 of the belt construction 27 are adapted to have a friction layer, that comprises a fabric impregnated with a polymeric composition, disposed thereon by such friction layer either being disposed only on the surfaces 30 and 31 thereof or by having the entire outside surface of the belt construction 27 wrapped with the friction layer.

In any event, it can be seen that the belt construction 27 illustrated in FIG. 2 is completely wrapped by a strip of the layer of material 20 of this invention so that opposed ends 35 and 36 of the layer 20 are disposed and secured in overlapping relation, such as on the top surface 28 of the belt construction 27 as illustrated in FIG. 2 and as is conventional in the belt making art.

When utilizing the layer 20 of this invention in forming the belt construction 27 of FIG. 2, it can be seen that the oriented particles 25 in the material 20 that is covering the angled sides 30 and 31 of the belt construction 27 are disposed substantially perpendicular to those sides 30 and 31 so that when the sides 30 and 31 would be engaged by a belt pulley or the like the oriented particles 25 provide columnar strength in the layer 20 between the angled sides 30 and 31 and the corresponding angled sides of the belt pulley receiving the belt construction 27 in a manner not provided by prior known polymeric wrappings or covering for belt constructions because the reinforcing particles provided therein are either randomly disposed or are oriented parallel to the opposed flat surfaces thereof in contrast to this invention wherein the oriented particles 25 have the long dimensions thereof disposed substantially perpendicular to the opposed flat surfaces 22 and 23 of the layer 20.

This feature of having the long dimensions of at least some of the reinforcing particles 25 disposed substantially perpendicular to the opposed flat surfaces 22 and 23 of the layer of material 20, is believed to render the layer 20 particularly adapted to provide the friction covering material for the driving or driven teeth of a synchronous belt construction or the like.

Figure 3:
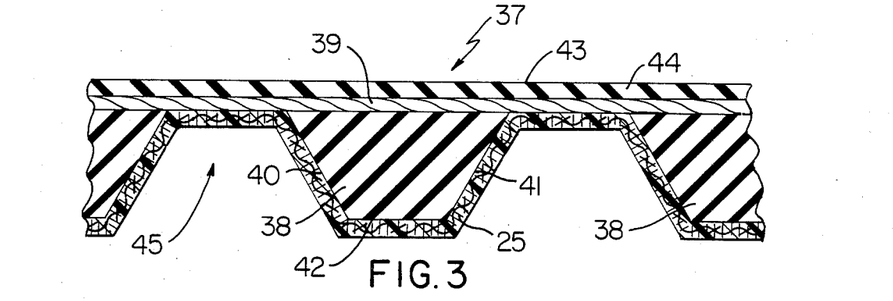
FIG. 3 is a fragmentary cross-sectional view illustrating another type of endless power transmission belt construction and utilizing the layer of material of this invention that is illustrated in FIG. 1.

For example, another endless power transmission belt construction of this invention is generally indicated by the reference numeral 37 in FIG. 3 and has a plurality of teeth 38 depending from a load carrying section 39 thereof in a conventional manner with each tooth 38 having angled opposed driving or driven sides 40 and 41 as well as a bottom surface 42 which is disposed substantially parallel to a top surface 43 of the belt construction 37 that is defined by the tension section 44 thereof in a manner well known in the art.

It is believed that by utilizing the layer 20 of this invention to cover the teeth 38 of the belt construction 37 in the manner illustrated in FIG. 3, not only are the long dimensions of the oriented reinforcing particles 25 of the layer 20 disposed substantially perpendicular to the angled driving or driven surfaces 40 and 41 of the teeth 38 so as to be substantially perpendicular to any forces being imposed against the sides 40 and 41 of the teeth 38 during the driving of the belt construction 37, but also the long dimensions of the oriented particles 25 are disposed substantially perpendicular to the flat end surfaces 42 of the teeth 38 as well as substantially perpendicular to the load carrying section 39 intermediate the teeth 38 as illustrated in FIG. 3 in the area generally indicated by the reference numeral 45 to protect the same from impacts thereto.

While the layer of material 20 of this invention has been previously described as forming the belt products 27 and 37 by providing an outside surface of the product 27 or 37, it is to be understood that the layer 20 of this invention could provide not only an outside surface thereof but also in addition thereto or in lieu thereof could form part of an inner layer of the belt product if desired.

Figure 9:
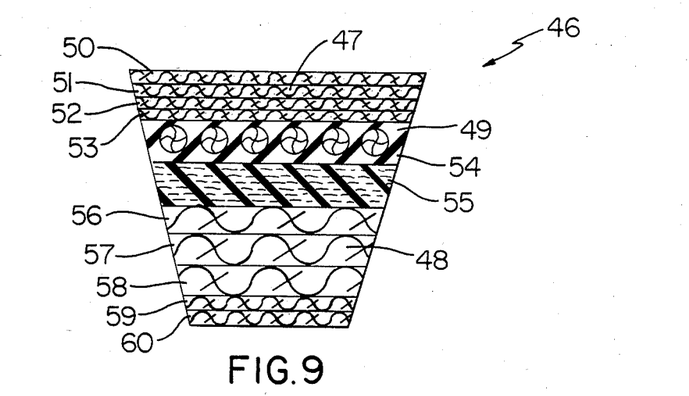
FIG. 9 is a cross-sectional view of another endless power transmission belt of this invention utilizing at least one of the layers of material of this invention.

For example, another typical belt construction is generally indicated by the reference numeral 46 in FIG. 9 and comprises a tension section 47, a compression section 48 and a load carrying section 49 disposed between the sections 47 and 48, the tension section 47 comprising a plurality of stacked layers 50, 51, 52 and 53, the tension section 49 comprising a layer or layer means 54 and the compression section 48 comprising a plurality of stacked layers 56, 57, 58, 59 and 60. Such a belt construction is fully described and illustrated in the U.S. Pat. No. 4,024,773 to Russell E. Hartman et al whereby this patent is being incorporated into this disclosure by this reference thereto.

It is believed according to the teachings of this invention that the layer 20 of this invention could form one or more of the layers 50–60 of the belt construction 43 illustrated in FIG. 9 so that the same will provide a structural member of the belt construction 46 as desired and provide columnar strength between the top and bottom surfaces of the belt construction for the reasons previously set forth.

While the layer of this invention has been previously described as forming endless power transmission belt constructions or the like, it is to be understood that there are other products that can utilize the layer means 20 of this invention.

Figure 10:
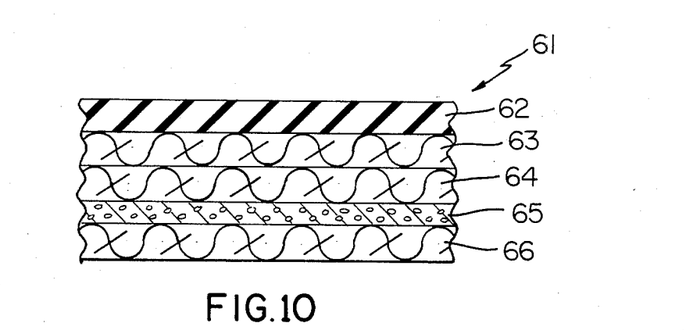
FIG. 10 is a fragmentary cross-sectional view illustrating a printing blanket utilizing at least one of the layers of material of this invention.

For example, reference is made to FIG. 10 wherein a printing blanket is generally indicated by the reference numeral 61 and comprises a plurality of layer means 62, 63, 64, 65 and 66 formed in the manner fully described and illustrated in the U.S. Pat. No. 4,086,386 to Andrew J. Gaworowski et al, whereby this patent is being incorporated into this disclosure by this reference thereto.

It is believed according to the teachings of this invention that one or more of the layers 62–66 of the printing blanket 61 can comprise the improved layer means 20 of this invention as previously described so as to provide columnar strength between the opposed top and bottom surfaces of the blanket 61 for the reasons previously set forth.

Figure 11:
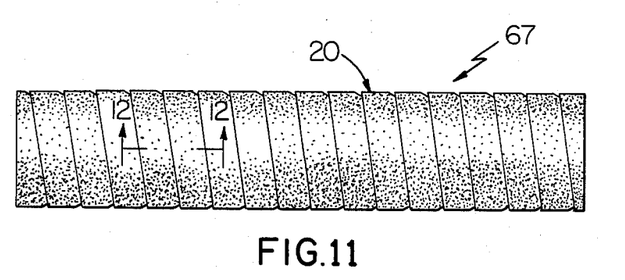
FIG. 11 is a side view of a hose construction utilizing one of the layers of material of this invention.
Figure 12:
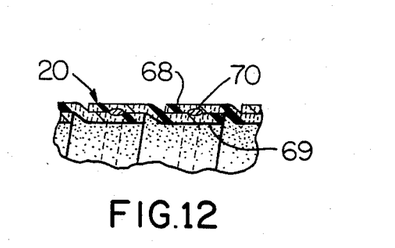
FIG. 12 is a fragmentary cross-sectional view taken on line 12—12 of FIG. 11.

In addition, it is believed according to the teachings of this invention that the layer means 20 of this invention can be utilized to form a hose construction, such as the hose construction 67 illustrated in FIGS. 11 and 12.

In particular, it can be seen in FIGS. 11 and 12 that a strip of the layer means 20 of this invention has been wound in a helical manner in a manner well known in the art to provide the tubular hose construction 67 wherein portions 68 and 69 of the strip or layer 20 are disposed in overlapping relation and being secured together in a manner well known in the art. In addition, a helically wound reinforcing wire means 70 can be disposed between the overlapping portions 68 and 69 of the helically wound strip 20 if desired. For example, the hose construction 67 illustrated in FIGS. 11 and 12 can be of the type fully illustrated and described in the U.S. Pat. No. 4,174,984 to Roger D. Meadows whereby this patent is being incorporated into this disclosure by this reference thereto.

In this manner, it is believed that the oriented particles 25 in the layer 20 for the hose construction 67 will provide columnar strength for the wall of the hose construction as the same are disposed substantially perpendicular to the axis thereof.

In addition, it is to be understood that the layer means 20 of this invention can be utilized for other products not disclosed in this application because it is believed that the same is readily adapted to be utilized where any such polymeric layer means is presently being used or where such polymeric layer means could possibly be used.

While the layer means 20 of this invention illustrated in FIG. 1 and previously described can be formed by any suitable method and apparatus, one method and apparatus of this invention for forming the layer means 20 of FIG. 1 is generally indicated by the reference numeral 71 in FIG. 4 and will now be described.

Figure 4:
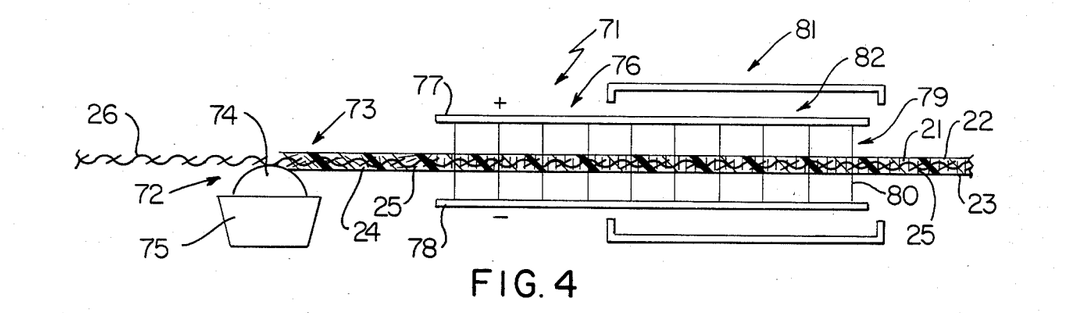
FIG. 4 is a schematic cross-sectional view illustrating one embodiment of the method and apparatus of this invention for making the layer of material of FIG. 1.

As illustrated in FIG. 4, the sheet of fabric 26 is being fed from a suitable supply roll thereof (not shown) to be moved in a continuous manner by suitable structure (not shown) from left to right through the apparatus 71 as illustrated in FIG. 4, the moving fabric sheet 26 passing over a layer applying device 72 which is adapted to apply a liquid layer of the polymeric material 24 on both sides of the sheet 26 in any sutiable manner so as to form a substantially flat liquid layer of polymeric material 24 as illustrated by the reference numeral 73 in FIG. 4, the liquid material 24 having the reinforcing particles 25 randomly disposed therein as the same is being applied to the fabric sheet 26.

While the applying means 72 can comprise any suitable liquid layer applying device, the same comprises a roll coater 74 receiving the polymeric material 24 and particles 25 from a reservoir 75 in any suitable manner. Further, while the applicator 72 is being illustrated as only applying liquid layer from the bottom side of the sheet 26, it is to be understood that the polymeric material 24 can be applied to the fabric sheet 26 on both sides thereof or only from the top thereof as desired. For example, see the U.S. Pat. No. 4,062,989 to Delmar D. Long for a disclosure of such applying means as well as for a disclosure for typical polymeric material that can form the polymeric material 24 whereby this patent is being incorporated into this disclosure by this reference thereto.

Also, see the aforementioned U.S. Pat. No. 3,657,938 to David G. Fisher and U.S. Pat. No. 4,027,545 to Jack W. White, Jr. for examples of typical reinforcing particles that can be utilized for the reinforcing particles 25 of this invention whereby these two patents are being incorporated into this disclosure by this reference thereto.

However, it is to be understood that other polymeric materials and reinforcing particles can be utilized according to the teachings of this invention than those set forth in the aforementioned patents that have been incorporated herein.

In any event, the liquid sheet 73 leaving the applicator 72 subsequently passes through an orienting means of the apparatus 71 of this invention that is generally indicated by the reference numeral 76 and comprises a pair of spaced apart substantially parallel electrode means 77 and 78 that are oppositely charged as illustrated and thereby define an electrostatic field therebetween that is generally indicated by the reference numeral 79, the electrostatic field 79 being defined by the field force lines 80 extending between the electrode means 77 and 78 in a manner well known in the art and as described in the aforementioned U.S. Pat. No. 4,338,729 to James T. Candor whereby this patent is being incorporated into this disclosure by this reference thereto.

It is believed that as the liquid layer 73 passes into and through the electrostatic field 79, the field force lines 80 of the field 79 will cause at least some of the particles 25 to have their long dimensions oriented so as to be disposed substantially perpendicular to the opposed flat sides 22 and 23 of the sheet 21 as illustrated in FIG. 4 and will hold such particles 25 in such oriented condition until the polymeric material 24 has been dried to at least a degree thereof which will hold the particles 25 in their oriented condition.

For example, a suitable heating means can be provided for the apparatus 71 and is generally indicated by the reference numeral 81 in FIG. 4, the heating means 81 comprising a tunnel means 82 in which heated air is directed against the sheet 21 as the same passes through the tunnel means 82 from left to right thereof so that by the time the sheet 21 leaves the right hand end of the heating tunnel 82, the polymeric material 24 thereof will have been sufficiently dried so that the same will hold the particles 25 in their oriented condition.

While the purpose of the electrostatic field 79 of the apparatus and method 71 illustrated in FIG. 4 is to orient the particles 25 in the sheet 21 so as to be disposed substantially perpendicular to the opposed surfaces 22 and 23 thereof for the reasons previously set forth, it may be found that the electrostatic field 79 also augments the heat drying of the sheet 21 as the same passes through the heating tunnel 82 for the reasons fully set forth in the aforementioned U.S. Pat. No. 4,338,729 to James T. Candor and the U.S. Pat. No. 4,359,826 to Robert R. Rounsley whereby these two patents are being incorporated into this disclosure by this reference thereto.

In any event, it can be seen that the method and apparatus 71 of this invention applies a liquid coating of the material 24 and particles 25 onto the fabric sheet 26 at the device 72 and then passes that resulting flat liquid layer through the electrostatic field 79 to have the electrostatic field 79 orient the long dimensions of at least some of the particles 25 substantially perpendicular to the opposed flat surfaces 22 and 23 of the sheet 21 and hold those particles 25 in such oriented condition until the drying means 81 sufficiently dries the polymeric material 24 so that the same will hold the particles 25 in their oriented condition after the material 24 passes outside of the influence of the electrostatic field 79 for the reasons previously set forth.

As previously set forth, it is believed that the electrostatic field 79 will also augment the heat drying of the sheet 21 as the same passes through the drying means 81 for the reasons set forth in the aforementioned U.S. Pat. Nos. 4,338,729 and 4,359,826. In fact, it is believed that by electrostatically pulsing the liquid of the liquid bearing material as the same passes through the electrostatic field in the manner of U.S. Pat. No. 4,338,729, such pulsing operation will augment the heat drying of the liquid bearing material to a greater degree while still permitting the particle orientation feature of this invention.

Figure 5:
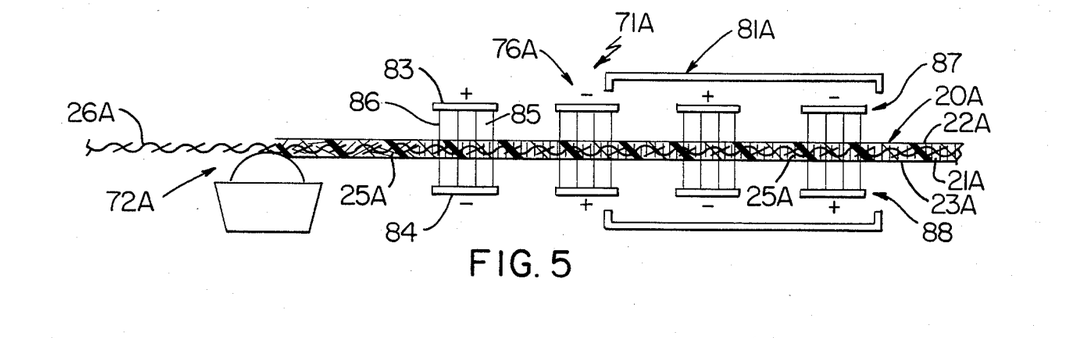
FIG. 5 is a view similar to FIG. 4 and illustrates another embodiment of the method and apparatus of this invention for making the layer of material of FIG. 1.

Accordingly, it is believed according to the teachings of this invention that the electrostatic orienting means 76 of the apparatus and method 71 of FIG. 4 can be changed to the orienting means 76A of FIG. 5 wherein parts of the method and apparatus 71A of FIG. 5 are indicated by like reference numerals followed by the reference letter "A".

As illlustrated in FIG. 5, the layer means 20A being formed by the method and apparatus 71A is substantially the same as the layer 20 previously described as the method and apparatus 71A includes the fabric sheet 26A and applying means 72A as well as the drying tunnel 81A all operating in the manner previously described. However, the orienting means 76A comprises a plurality of pairs of electrode means 83 and 84 each being oppositely charged to define an electrostatic field 85 therebetween to provide the field force lines 86 which will orient at least some of the particles 25A in the manner previously described so that their long dimension will be disposed substantially perpendicular to the opposed surfaces 22A and 23A of the sheet 21A. However, each pair of electrode means 83 and 84 is oppositely charged relative to the adjacent pair of electrode means 83 and 84 so that the upper row of electrodes 83 that is generally indicated by the reference numeral 87 in FIG. 5 are alternately charged positive, negative, positive, negative, etc. while the bottom row 88 of electrodes 84 are likewise alternately charged negative, positive, negative, positive, etc. as illustrated so that a pulsing action will be provided on the liquid particles of the sheet 21A as the same pass through the alternately directed electrostatic fields 85 even though the electrostatic fields 85 maintain the orientation of the long dimensions of the particles 25 substantially perpendicular to the surfaces 22A and 23A for the reasons previously set forth. The alternately pulsing of the liquid particles in the sheet 21A as the same pass through the heating tunnel 81A is believed to further augment the heat drying of the sheet 21A for the reasons fully set forth in the aforementioned U.S. Pat. No. 4,338,729 to Candor.

In this manner, it is believed that the electrostatic field of the invention provides a dual function, namely, orient at least some of the reinforcing particles relative to the liquid polymeric material carrying the same and reduce the drying rate required for drying the polymeric material to hold the oriented particles in their oriented condition as well as dry the resulting sheet to the desired degree of dryness for making a desired product.

For example, as set forth in the copending patent application Ser. No. 350,969, filed Feb. 22, 1982, of Delmar D. Long, when it is desired to secure a layer means comprising polymeric material and a reinforcing fabric therein to a belt construction in substantially the same manner as set forth in FIGS. 2 and 3 previously described, one surface of the layer means is to have a particular polymeric material disposed thereon so that such coating will be more tacky and readily secure that layer means to the belt construction whereby such copending patent application is being incorporated into this disclosure by this reference thereto. It is believed that such unique layer means can be improved if the same has the reinforcing means therein oriented according to the teachings of this invention.

Figure 6:
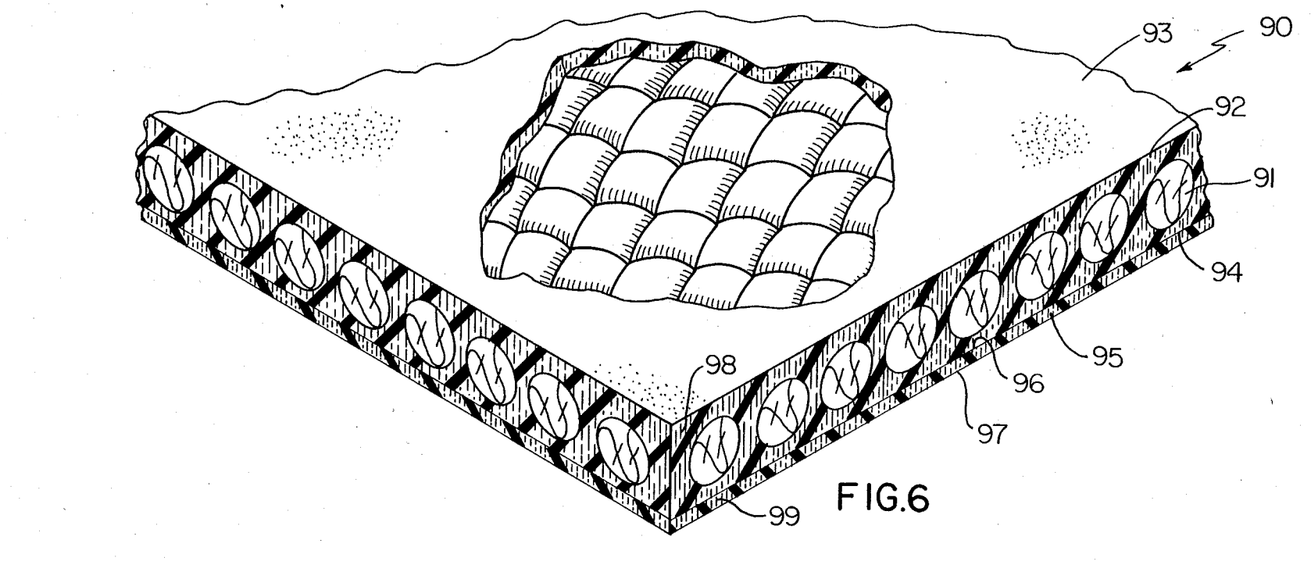
FIG. 6 is a broken away cross-sectional perspective view of another layer of material of this invention.

In particular, such a layer means is generally indicated by the reference numeral 90 in FIG. 6 and comprises a fabric sheet 91 having polymeric material 92 disposed on both sides thereof so that the fabric sheet 91 is disposed in substantially parallel relation between opposed flat surfaces 93 and 94 of the polymeric material 92 while being substantially coextensive therewith. A tacky polymeric layer 95 of the type previously described has its side 96 secured to the side 94 of the polymeric material 92 and has a flat outer surface 97 which is adapted to be secured to the desired structure such as the belt construction 27 or 37 illustrated in FIGS. 2 and 3 for the reasons previously set forth and for the reasons set forth in the aforementioned copending patent application Ser. No. 350,969.

Figure 7:
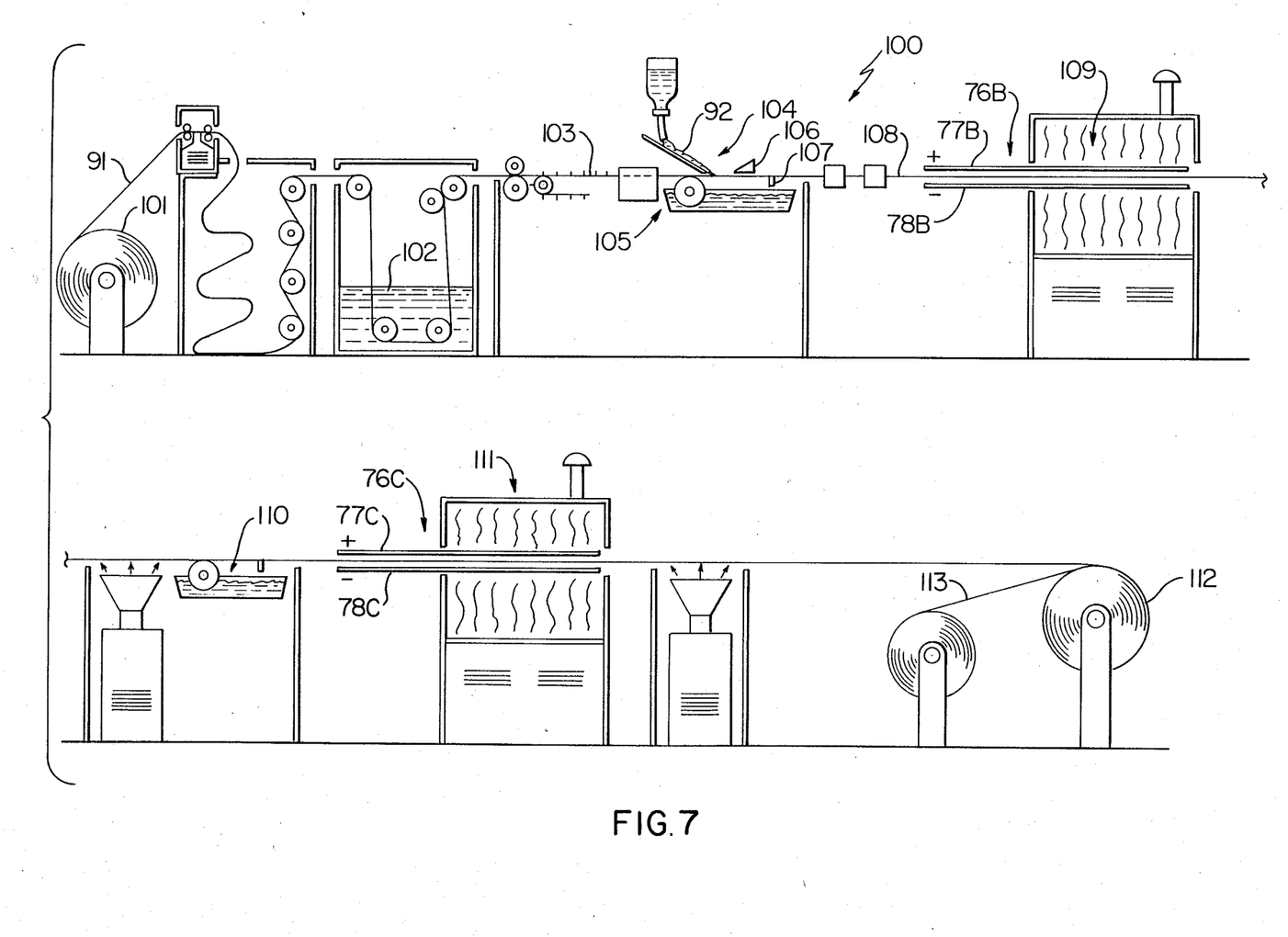
FIG. 7 is a schematic view illustrating another embodiment of the method and apparatus of this invention for making the layer of material of FIG. 6.
Figure 8:
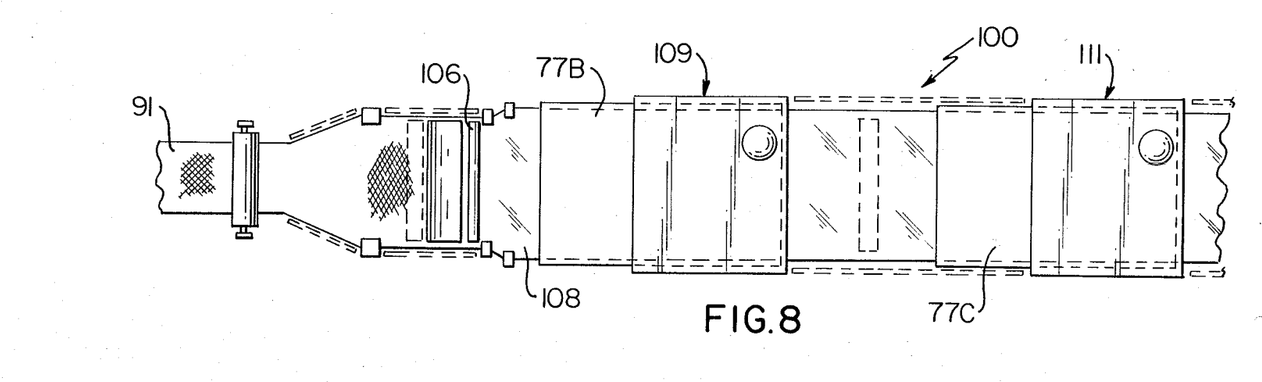
FIG. 8 is a schematic, fragmentary, reduced top view of the apparatus of FIG. 7.

An apparatus of this invention for forming the layer means 90 illustrated in FIG. 6 is illustrated schematically in FIGS. 7 and 8 and is substantially identical to the apparatus set forth in the aforementioned copending patent application, Ser. No. 350,969, except that the same has been modified to include not only the electrostatic means 76B in combination with the heat drying means for the polymeric material 92 as previously described, but also to include an electrostatic orienting means 76C in connection with the drying means for the tacky layer 95 as will be apparent hereinafter should it be found desirable to orient reinforcing particles in the tacky layer 95.

In this manner, at least some of the reinforcing particles that are disposed in the polymeric material 92 and indicated by the reference numeral 98 in FIG. 6 will be oriented with their long dimensions disposed substantially perpendicular to the flat surfaces 93 and 94 thereof by the electrostatic means 76B while at least some of the reinforcing particles 99 in the tacky layer 95 will be oriented so as to have the long dimensions thereof disposed substantially perpendicular to the surfaces 96 and 97 of the tacky layer 95 by the electrostatic means 76C as illustrated in FIG. 6.

Of course, it is to be understood that the layer of material 90 need not have reinforcing particles 99 therein, let alone be oriented in the layer 95 thereof if desired as the orientation of the particles 98 in the layer means 92 may be all that is required.

In any event, the method and apparatus for making the layer means 90 of FIG. 6 is generally indicated by the reference numeral 100 in FIGS. 7 and 8 and will now be described.

As illustrated in FIG. 7, the fabric sheet 91 is fed from a supply roll 101 thereof through a liquid 102 that impregnates and lubricates the threads thereof so that the same can be readily stretched on a tenter frame 103 in a direction transverse to the longitudinal direction of the fabric sheet 91. Thereafter, the liquid polymeric material 92 is applied to the top and bottom surfaces of the fabric layer 91 by coating means illustrated respectively and generally by the reference numerals 104 and 105 in FIG. 7 with such material 92 being doctored by doctor means 106 and 107 disposed on opposite sides of the now coated fabric means 91 to produce the liquid coated sheet that is indicated by the reference numeral 108 in FIG. 7.

The liquid coated sheet 108 is now passed through the particle orienting means 76B which comprises the pair of spaced apart charged electrode plates 77B and 78B which create the electrostatic field therebetween to orient at least some of the reinforcing particles 98 in the liquid polymeric material 92 in the manner illustrated in FIG. 6. While the particles 98 are being held in such oriented condition by the electrostatic means 76B, the layer 108 is passed through a heating apparatus that is generally indicated by the reference numeral 109 in FIG. 7 to at least dry the polymeric material 92 sufficiently so that the same will hold the particles 98 in the oriented condition illustrated in FIG. 6 and for the reasons previously set forth in regards to the method and apparatus 71 of FIG. 4.

Thereafter, the surface 94 of the dried polymeric material 92 has the liquid polymeric coating 95 applied thereto by the coating means 110 illustrated in FIG. 7 whereby the liquid coating 110 on the surface 94 then has at least part of the reinforcing particles 99 therein oriented by the electrostatic orienting means 76C which comprises the pair of spaced apart charged electrode plates 77C and 78C that create an electrostatic field therebetween in the same manner as the electrode means 77, 78 of FIG. 4. The electrostatic field of the orienting means 76C orients at least some of the particles 99 in the layer 95 so as to be substantially perpendicular to the opposed surfaces 96 and 97 thereof and while the electrostatic field is holding the particles 99 in such oriented condition in the layer 95, the sheet means 90 is passed through a drying means that is generally indicated by the reference numeral 111 in FIG. 7 to dry the coating 95 to at least a degree thereof that the material 95 will hold the particles 99 in the oriented condition thereof without requiring the electrostatic field means 76C whereby the resulting sheet 90 can then be wound on a supply roll 112 and have a layer 113 wound therewith to prevent the tacky layer 95 from securing to itself in the roll 112 as is well known in the art.

Therefore, it can be seen that the layer means 90 illustrated in FIG. 6 can be used in the same manner as the layer means 20 illustrated in FIG. 1 for the reasons previously set forth and for the reasons set forth in the aforementioned copending patent application, Ser. No. 350,969.

Accordingly, it can be seen that the method of this invention 71, 71A and 100 illustrated respectively in FIGS. 4, 5 and 7 can be each utilized to make a substantially flat layer of material having opposed substantially parallel spaced apart flat surfaces by orienting the long dimensions of at least a part of the reinforcing particles in the polymeric material thereof so as to be disposed substantially perpendicularly to those opposed surfaces, the method of this invention including the steps of providing a liquid layer of the polymeric material and reinforcing particles wherein the reinforcing particles are initially randomly disposed in the liquid layer, orienting at least some of those particles by passing the liquid layer through an electrostatic field means while the field lines thereof are disposed substantially transverse to the liquid layer to thereby cause at least some of the particles to have the long dimensions thereof disposed substantially perpendicular to the opposed surfaces of the layer, and, thereafter, drying the liquid layer to at least a degree thereof that the polymeric material thereof will hold the particles in the oriented condition thereof without having the electrostatic field means imposed thereon, the step of drying taking place while the electrostatic field means is holding the particles in the oriented condition thereof.

After such layer of material has been formed by the method and apparatus of this invention, the same can be utilized to produce a product in any of the manners previously set forth whereby the layer means will have columnar strength between the opposed flat surfaces thereof provided by the long dimensions of the oriented reinforcing particles thereof being disposed substantially perpendicularly to those opposed flat surfaces.

Therefore, it can be seen that this invention not only provides an improved layer of material and method and apparatus of making the same, but also this invention provides an improved product utilizing such a layer means.

While the forms and methods of this invention now preferred have been illustrated and described as required by the Patent Statute, it is to be understood that other forms and method steps can be utilized and still fall within the scope of the appended claims.

What is claimed is:

1. In a method of making a substantially flat layer of material having opposed substantially parallel spaced apart flat surfaces and comprising the steps of forming said material to comprise polymeric material and reinforcing particles disposed in said polymeric material by providing a liquid layer of said polymeric material and said reinforcing particles wherein said reinforcing particles are randomly disposed in said liquid layer and said liquid layer has said opposed substantially flat surfaces, orienting the long dimensions of at least a part of the particles thereof relative to said surfaces while said polymeric material is in said liquid layer thereof, and then drying said liquid layer to at least a degree thereof that causes said polymeric material thereof to hold said part of said particles in said oriented condition thereof, the improvement wherein said step of orienting said part of said particles comprises the step of orienting said long dimensions thereof so as to be disposed substantially perpendicular to said surfaces and wherein said step of providing said liquid layer of said polymeric material and said reinforcing particles comprises the step of coating a fabric sheet means with said polymeric material and said reinforcing particles while said polymeric material is in said liquid form thereof whereby said fabric sheet means is disposed in said liquid layer and is substantially between said flat surfaces thereof.

2. A method of making a layer of material as set forth in claim 1 wherein said step of orienting comprises the step of orienting said part of said reinforcing particles with the force of field line means imposed thereon.

3. A method of making a layer of material as set forth in claim 2 wherein said step of orienting with said field line means comprises the step of utilizing electrostatic field means.

4. A method of making a layer of material as set forth in claim 1 and including the step of stretching said fabric sheet means in at least one direction thereof before said step of coating said fabric sheet means.

5. A method of making a layer of material as set forth in claim 1 wherein said step of orienting comprises the step of passing said liquid layer through electrostatic field means while said field lines thereof are disposed substantially transverse to said liquid layer to thereby cause said part of said particles to have said long dimensions thereof disposed substantially perpendicular to the opposed surfaces of said layer, and wherein said step of drying said liquid layer to at least a degree thereof that causes said polymeric material thereof to hold said part of said particles in said oriented condition thereof without having said electrostatic field means imposed thereon comprises the step of so drying said liquid layer while said electrostatic field means is holding said part of said particles in said oriented condition thereof.

6. A method of making a layer of material as set forth in claim 5 wherein said step of passing said liquid layer through said electrostatic field means comprises the steps of disposing at least one pair of electrode means in spaced apart relation, charging said electrode means to define an electrostatic field means therebetween, and passing said liquid layer between said electrode means.

* * * * *